(12) United States Patent
Adachi et al.

(10) Patent No.: US 6,409,527 B1
(45) Date of Patent: Jun. 25, 2002

(54) REDUCED NOISE ROTATING CONNECTOR

(75) Inventors: Ryoichi Adachi, Kameyama; Yoshimi Noro, Aichi, both of (JP)

(73) Assignee: The Furukawa Electric, Co., LTD (JP)

( * ) Notice: Subject to any disclaimer, the term of this patent is extended or adjusted under 35 U.S.C. 154(b) by 0 days.

(21) Appl. No.: 09/693,579

(22) Filed: Oct. 20, 2000

(30) Foreign Application Priority Data

Oct. 22, 1999 (JP) ............................................. 11-301181

(51) Int. Cl.$^7$ .................................................. H01R 3/00
(52) U.S. Cl. .......................................... 439/164; 439/15
(58) Field of Search ........................... 439/15, 164, 13, 439/17

(56) References Cited

U.S. PATENT DOCUMENTS

| | | | |
|---|---|---|---|
| 5,259,775 A | * 11/1993 | Kubota et al. | 439/164 |
| 5,637,005 A | * 6/1997 | Bannai et al. | 439/164 |
| 5,655,919 A | * 8/1997 | Ishikawa et al. | 439/164 |
| 5,669,777 A | * 9/1997 | Matsumoto et al. | 439/164 |
| 5,980,286 A | * 11/1999 | Best et al. | 439/164 |

* cited by examiner

Primary Examiner—Brian Sircus
Assistant Examiner—Son V. Nguyen
(74) Attorney, Agent, or Firm—Knobbe, Martens, Olson & Bear, LLP

(57) ABSTRACT

The rotating connector contains a first case and a second case, which are combined to be rotatable relative to each other and define an annular space inside; a ring member having a plurality of rollers arranged in the circumferential direction within the annular space, the ring member being capable of moving in the circumferential direction within the annular space; and a spirally wound belt-shaped transmission line having an inverting section at an intermediate portion thereof, where the winding direction of the transmission line is inverted by one of the rollers, one end and the other end of the spirally wound transmission line being connected to the first case and to the second case respectively. The second case has a bottom plate; the ring member contains, among the plurality of rollers, regulating rollers each having an abutting shaft to be abutted against the bottom plate, the abutting shaft controlling the face of the regulating roller opposing the bottom plate not to contact with the bottom plate.

7 Claims, 4 Drawing Sheets

REDUCED NOISE ROTATING CONNECTOR

BACKGROUND OF THE INVENTION

1. Field of the Invention

The present invention relates to a rotating connector for transmitting electric signals and/or light signals and the like between two parts which rotate relative to each other.

2. Description of the Related Art

There are known, as the rotating connector for transmitting electric power or electric signals and/or light signals and the like between two parts which rotate relative to each other, for example, those which are incorporated into vehicular steering equipments to connect electrically the bodies of the vehicles with air bags and to be used for actuation of the air bags.

Particularly, there is known a rotating connector having a rotating case and a fixed case which are combined to be rotatable relative to each other and define an annular space in them; a ring member having a plurality of rollers, which is contained in the annular space to be movable in the circumferential direction; and a spirally wound flat cable also contained in the annular space, the flat cable having one end and the other end thereof connected to the fixed case and to the rotating case respectively.

However, in the rotating connector having such a ring member, the ring member contained in the annular space moves in the axial direction therein to bump against the upper and lower internal surfaces of the cases to generate noises, so-called rattling. Thus, reduction of such noises is expected in automobiles, particularly in prestige cars that demand quietness inside them.

SUMMARY OF THE INVENTION

It is an objective of the present invention to provide a rotating connector capable of holding down noise generation even in the presence of the ring member.

In order to attain the above objective, the rotating connector of the present invention is of the constitution containing a first case and a second case, which are combined to be rotatable relative to each other and define an annular space inside; a ring member having a plurality of rollers arranged in the circumferential direction within the annular space, the ring member being capable of moving in the circumferential direction within the annular space; and a spirally wound belt-shaped transmission line having an inverting section at an intermediate portion thereof, where the winding direction of the transmission line is inverted by one of the rollers, one end and the other end of the spirally wound transmission line being connected to the first case and to the second case respectively: wherein the second case has a bottom plate; the ring member contains, among the plurality of rollers, regulating rollers each having an abutting shaft to be abutted against the bottom plate, the abutting shaft controlling the face of the roller opposing the bottom plate not to contact with the bottom plate.

The present invention can provide a rotating connector capable of holding down noise generation even in the presence of the ring member.

Preferably, the ring member has a constitution where it supports the rollers resiliently.

The above and other objects, aspects and advantages of the invention will become apparent from the following detailed description, taken in conjunction with the accompanying drawings.

DETAILED DESCRIPTION OF THE PREFERRED EMBODIMENTS

A rotating connector according to one embodiment of the present invention will be described specifically referring to FIGS. 1 to 6.

Figure 1:
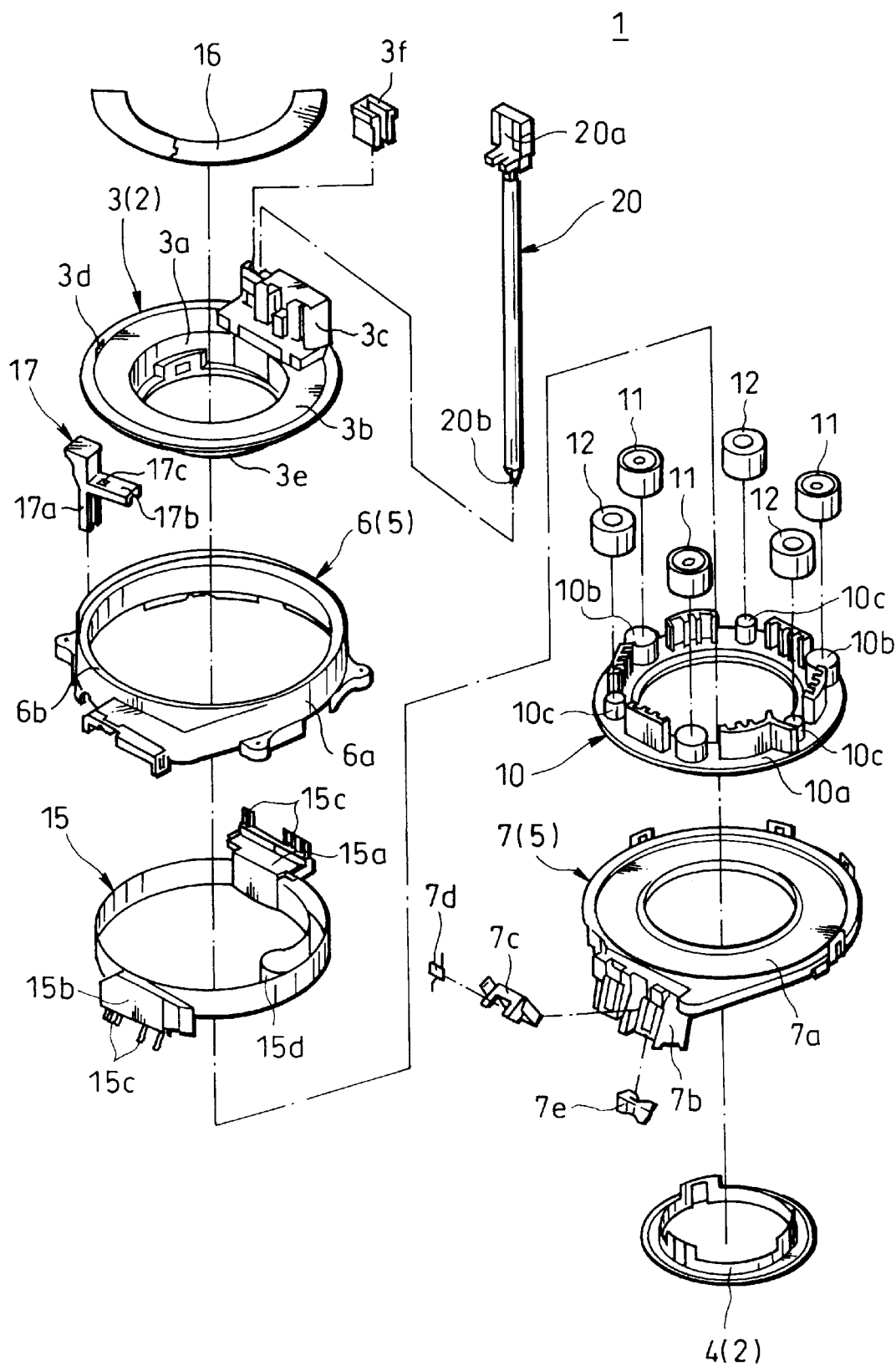
FIG. 1 is an exploded perspective view showing a procedure of assembling the rotating connector according to the present invention.

As shown in FIG. 1, the rotating connector 1 is provided with a rotating case 2, a fixed case 5, a ring member 10 and a flat cable 15. The rotating case 2, the fixed case 5 and the ring member 10 are molded from a synthetic resin such as polyacetal (POM), polybutylene terephthalate (PBT), polypropylene (PP) and acrylonitrile butadiene styrene (ABS).

The rotating case 2 is a first case of the rotating connector 1 and has a rotator 3 and a sleeve 4, as shown in FIG. 1. The rotating case 2 is combined with the fixed case 5 to be rotatable relative to each other and to define an annular space S therein (see FIG. 2).

The rotator 3 has an inner cylindrical shaft 3a and an upper flange 3b. The upper flange 3b has a connecting post 3c and a protrusion 3d, and further a caution label 16 carrying an instruction in handling and the like is stuck onto the upper surface of the upper flange 3b. Meanwhile, the inner cylindrical shaft 3a has a step 3e (see FIG. 2) formed along the lower outer periphery. A harness 20, which has a connector 20a attached to one end thereof and a conductor 20b exposed at the other end thereof is connected at the other end to the connecting post 3c, and a post cover 3f is fitted thereto.

Figure 2:
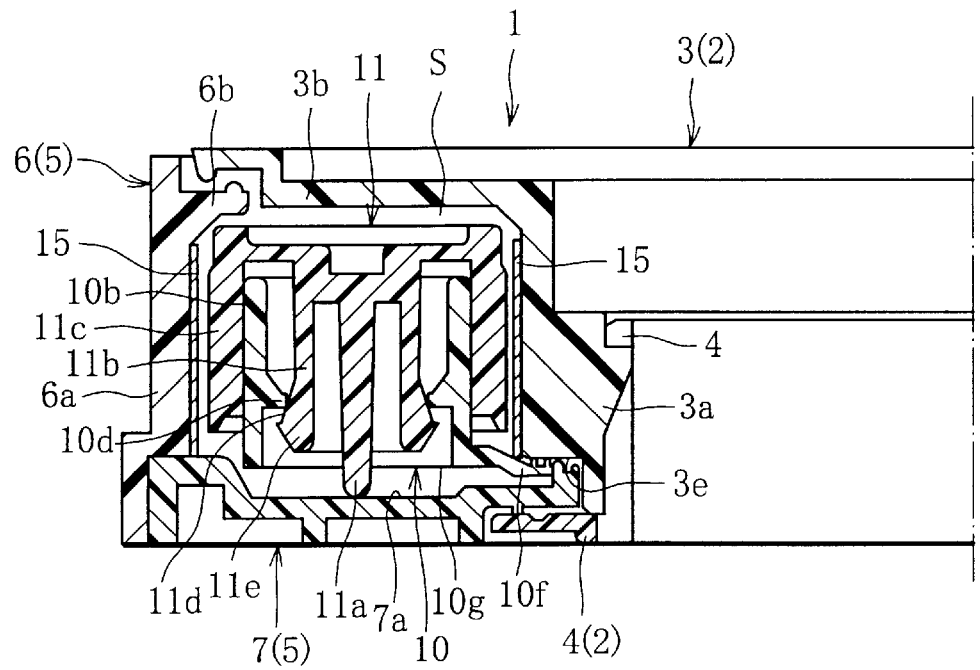
FIG. 2 is a cross-sectional front view showing a left half (cut diametrically) of the rotating connector assembled according to FIG. 1.

The sleeve 4 is molded into a ring form and is attached to the inner cylindrical shaft 3a of the rotator 3 by inserting it from the lower side of a stator 7 (to be described later), as shown in FIG. 2.

The fixed case 5 is a second case of the rotating connector 1 and has a sub-stator 6 and a stator 7 serving as a bottom plate.

The sub-stator 6 has an outer cylinder 6a and an upper flange 6b formed at the top of the outer cylinder 6a so as to extend slightly radially inward. Further, a fastening pin 17 is detachably fitted to the external wall of the outer cylinder 6a of the sub-stator 6. The fastening pin 17 maintains the assembled rotating connector 1 at the neutral position of the flat cable 15. The fastening pin 17 has a main shaft 17a to be attached to the external wall of the outer cylinder 6a, and an arm 17b containing an engaging hole 17c. The fastening pin 17 restricts rotation of the rotator 3 and the sub-stator 6 under engagement of the engaging hole 17c defined in the arm 17b with the protrusion 3d of the rotator 3.

The stator 7, which is located under the sub-stator 6, is a disc-shaped part having an opening defined at the center and has a fitting section 7b formed at the outer edge. The fitting section 7b has a locking piece 7c, a locking spring 7d and a short spring 7e attached thereto.

Figure 4:
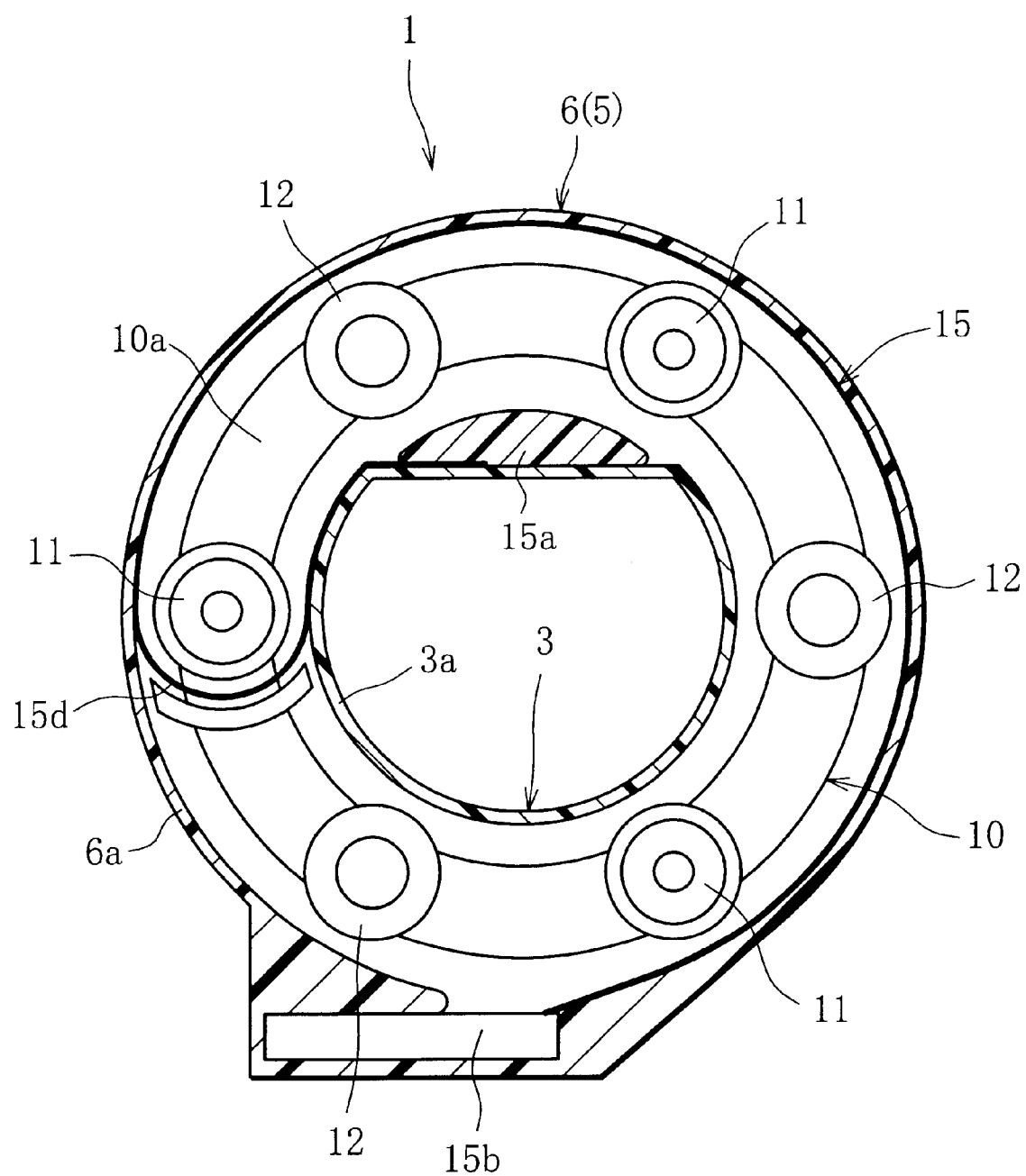
FIG. 4 is a cross-sectional plan view (cut on a plane orthogonal to the rotational axis) of the rotating connector assembled according to FIG. 1.

The ring member 10 is contained in the annular space S (see FIG. 2) to be movable therein in the circumferential direction, and is provided with three fitting cylinders 10b and three fitting cylinders 10c arranged alternately on the upper surface of the ringshaped main body 10a in the circumferential direction, as shown in FIG. 1. The fitting cylinder 10b has an engaging ridge 10d formed on the internal surface, as shown in FIG. 2. As shown in FIGS. 1 and 4, the ring member 10 has regulating rollers 11 and rollers 12 fitted to the fitting cylinders lob and to the fitting cylinders 10c respectively, and these rollers are supported resiliently. The ring member 10 also has on the internal surface of the main body 10a an inner peripheral rim 10f to be abutted resiliently against the lower surface of the step 3e formed on the inner cylindrical shaft 3a.

Here, the rollers 11 and 12 each guide the flat cable 15 (to be detailed later), and one of the regulating rollers 11 is utilized to invert the winding direction of the flat cable 15 and form an inverting section 15d to be described later. Particularly, each regulating roller 11 has an abutting shaft 11a, an inner barrel 11b and an outer barrel 11b, as shown in FIG. 2. A resilient engaging piece 11e having a tapered face lid is formed on the inner barrel 11b. Thus, when the regulating roller 11 is fitted to the fitting cylinder lob, the resilient engaging piece 11e is resiliently engaged with the engaging ridge 10d and is supported resiliently by the fitting cylinder 10b.

The flat cable 15 is a belt-shaped flexible transmission line, which transmits electric power or electric signals and has excellent electroconductive properties. The flat cable 15, which contains a plurality of flat conductors arranged parallel to one another and coated with an electrical insulating synthetic resin, has a first molded portion 15a and a second molded portion 15b formed at one end (inner end) and at the other end (outer end) respectively, as shown n FIG. 1. Terminals 15c connected to the conductors respectively protrude from the molded portions 15a and 15b. The flat cable 15 is wound spirally, the winding direction of which is inverted at the intermediate inverting section 15d, as shown in FIGS. 1 and 4, and is contained in the annular space S (see FIG. 2). Here, the flat cable 15 is contained in the annular space S (see FIG. 2) after it is adjusted to assume a neutral state between the wound state and the unwound state so as to allow the rotator 3 to rotate the same number of times both clockwise and counterclockwise. It should be noted here that the flat cable 15 is of course not only for transmitting electric power, electric signals or light signals but also for transmitting both of such signals.

The rotating connector 1 is of the constitution as described above and is assembled in the following manner.

Referring first to the rotator 3, the other end of the harness 20 is connected to the connecting post 3c beforehand, and the post cover 3f is attached to the post 3c. Further, the caution label 16 is stuck to the upper flange 3b. Meanwhile, referring to the ring member 10, the regulating rollers 11 and the rollers 12 are fitted to the fitting cylinders 10b and to the fitting cylinders 10c respectively.

The flat cable 15 is engaged at the intermediate inverting section 15d with one of the regulating rollers 11 to assume the state as shown in FIG. 1, and the cable 15 is as such attached to the ring member 10.

Then, as shown in FIG. 1, the ring member 10 is mounted on the stator 7 and is covered at the top with the rotator 3 and the sub-stator 6 to combine the rotator 3, the sub-stator 6 and the stator 7 one another. The sleeve 4 is then inserted from the lower side and attached to the rotator 3.

Next, the rotator 3 is rotated clockwise or counterclockwise to adjust the flat cable 15 to assume the neutral state between the wound state and the unwound state, and then the locking piece 7c, the locking spring 7d and the short spring 7e are attached to the fitting section 7b. Further, the fastening pin 17 is attached to the sub-stator 6 to engage the engaging hole 17c with the protrusion 3d of the rotator 3 so as to restrict rotation of the rotator 3 and the sub-stator 6 relative to each other, giving an assembled rotating connector 1.

Here, the rotating connector 1 can be used easily whenever it is necessary, if the fastening pin 17 is detached from the sub-stator 6, and the locking piece 7c is detached from the fitting section 7b together with the locking spring 7d and the short spring 7c. Thus, the rotating case 2 in the rotating connector 1 can be rotated clockwise or counterclockwise with respect to the fixed case 5 by the number of times according to the length of the flat cable 15. When the rotating case 2 is rotated as described above, the ring member 10 is moved by the inverting section 15d of the flat cable 15 engaged with the regulating roller 11 in the circumferential direction within the annular space S (see FIG. 2) defined by the rotating case 2 and the fixed case 5, facilitating smoother winding and unwinding of the flat cable 15.

In the thus assembled rotating connector 1, the ring member 10 is abutted at the tip of the inner peripheral edge 10f resiliently against the lower surface of the step 3e formed along the lower outer periphery of the inner cylindrical shaft 3a, and the abutting shaft 11a of the regulating roller 11 is abutted against the upper surface 7a of the stator 7, as shown in FIG. 2.

Thus, the ring member 10 is controlled such that the lower face 10g thereof does not contact with the upper surface 7a of the stator 7, so that the element 10 can move in the circumferential direction within the annular space S (see FIG. 2) without contacting with the upper surface 7a of the stator 7.

Therefore, the ring member 10 is controlled not to bump against the rotator 3 or the stator 7 even if the rotating connector 1 is shaken in the direction of the axis of rotation by vibrations and the like which occur as the vehicle runs, thus preventing noise generation, so-called rattling.

Here, needless to say, the ring member 10 is not to be limited to the above embodiment so long as it can support the regulating rollers 11 resiliently on the fitting cylinders 10b, and the following constitutions are also possible.

In the drawings referred to in the following description, those elements which are the same as in the above embodiment are affixed with the same reference numbers respectively, and description of them will be omitted so as to avoid redundancy.

Figure 3:
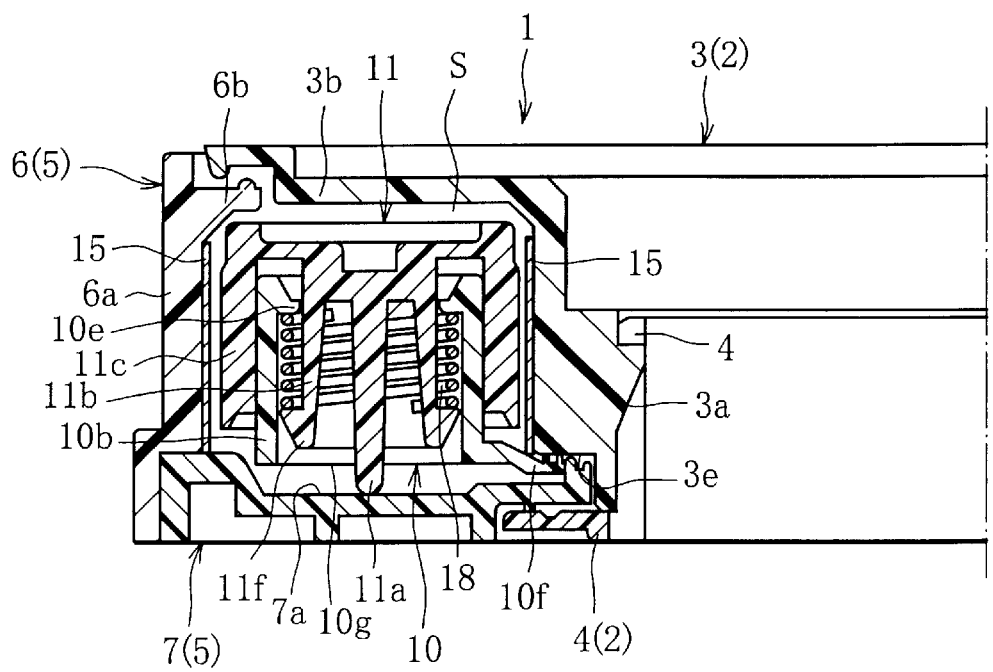
FIG. 3 is a cross-sectional front view of a left half (cut diametrically) of the rotating connector showing a ring member according to another embodiment.

In the ring member 10, the engaging ridge 10d formed on the inner surface of the fitting cylinder 10b may be replaced with a stopping ridge 10e formed at an upper part, as shown in FIG. 3, and a resilient engaging piece 11f having a hook-like shape is formed on the inner barrel 11b of the regulating roller 11. In the ring member 10, a push spring 18 may be located between the fitting cylinder 10b and the inner barrel 11b to be supported resiliently between the stopping ridge 10e and the resilient engaging piece 11f, as illustrated.

Figure 5:
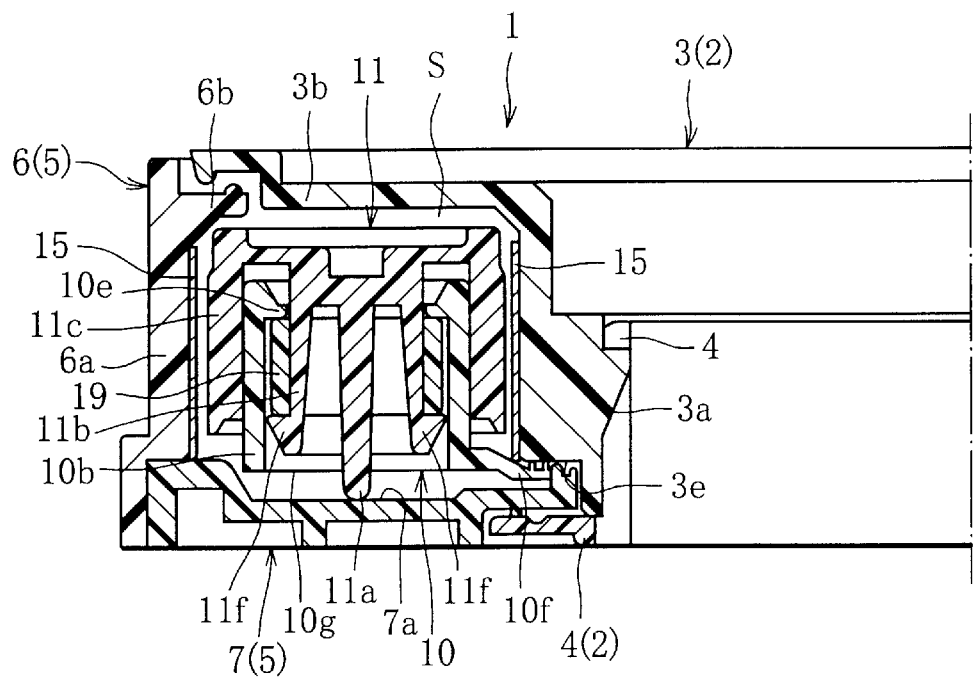
FIG. 5 is a cross-sectional front view of a left half of the rotating connector showing a ring member according to another embodiment.

Otherwise, in the ring member 10, as shown in FIG. 5, the push spring 18 located between the fitting cylinder 10b and the inner barrel 11b may be replaced with a resilient part 19 made of a synthetic resin such as acrylonitrile-butadiene rubber (NBR), a silicone rubber or an elastomeric resin, and the resilient part 19 may be supported resiliently between the stopping ridge 10e and the resilient engaging piece 11f.

Figure 6:
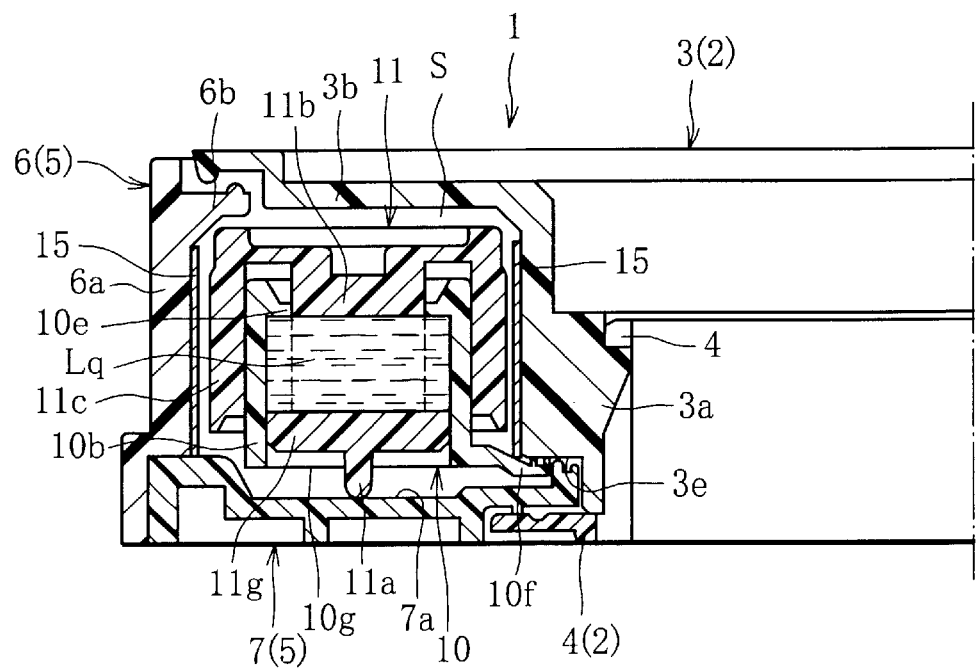
FIG. 6 is a cross-sectional front view of a left half of the rotating connector showing a ring member according to another embodiment.

Otherwise, in the ring member 10, the abutting shaft 11a may be extended at a lower part radially outward to form a sealing flange 11g to be brought into intimate contact with the inner wall of the fitting cylinder 10b, as shown in FIG. 6. Thus, the ring member 10 may have each regulating roller 11 supported resiliently on the fitting cylinder 10b with the aid of a fluid Lq such as oil, grease or air filled in the closed space defined by the fitting cylinder 10b, the inner barrel 11b and the sealing flange 11g.

What is claimed is:

1. A rotating connector comprising:

a first case and a second case, which are combined to be rotatable relative to each other and define an annular space inside;

a ring member supporting a plurality of rollers arranged in a circumferential direction within the annular space, the ring member being movable in the circumferential direction within the annular space; and a spirally wound belt-shaped transmission line, where the transmission line is inverted by one of the rollers, a first end and a second end of the spirally wound transmission line being connected to the first case and to the second case respectively;

wherein the second case has a bottom plate;

wherein one or more of the rollers has an abutting shaft to be abutted against the bottom plate, wherein the ring member is interposed between the rollers and the bottom plate, wherein the abutting shaft extends through the ring member, and wherein the abutting shaft maintains a face of the ring member opposing the bottom plate out of contact with the bottom plate.

2. The rotating connector according to claim 1, wherein the ring member supports the plurality of rollers resiliently thereon.

3. The rotating connector according to claim 2, wherein the ring member contains fitting cylinders each having an engaging ridge, and wherein a plurality of regulating rollers are resiliently supported by the fitting cylinders.

4. A rotating connector comprising:

a first case and a second case, which are combined to be rotatable relative to each other and define an annular space inside;

a ring member having a plurality of rollers arranged in the circumferential direction within the annular space, the ring member being movable in the circumferential direction within the annular space; and a spirally wound belt-shaped transmission line having an inverting section at an intermediate portion thereof, where the winding direction of the transmission line is inverted by one of the rollers, one end and the other end of the spirally wound transmission line being connected to the first case and to the second case respectively;

wherein the second case has a bottom plate; the ring member contains, among the plurality of rollers, one or more regulating rollers each having an abutting shaft to be abutted against the bottom plate, the abutting shaft maintaining the face of the ring member opposing the bottom plate out of contact with the bottom plate, wherein the regulating rollers each contain further an inner barrel and an outer barrel, and a resilient engaging piece having a tapered face is formed on the inner barrel.

5. The rotating connector according to claim 4, wherein a push spring is located between the fitting cylinder and the inner barrel of the regulating roller in the ring member.

6. The rotating connector according to claim 4, wherein the ring member contains a resilient member made of a synthetic resin located between the fitting cylinder and the inner barrel of the regulating roller.

7. The rotating connector according to claim 4, wherein the ring member has a closed space defined between the fitting cylinder and the inner barrel of the regulating roller, and the space is filled with a fluid.

* * * * *

UNITED STATES PATENT AND TRADEMARK OFFICE
CERTIFICATE OF CORRECTION

PATENT NO.    : 6,409,527 B1
DATED         : June 25, 2002
INVENTOR(S)   : Adachi et al.

It is certified that error appears in the above-identified patent and that said Letters Patent is hereby corrected as shown below:

<u>Title page,</u>
Item [73], Assignee, please add:

-- Kabushiki Kaisha Tokai Rika Denki Seisakusho, Aichi, Japan --

Signed and Sealed this

Sixteenth Day of March, 2004

JON W. DUDAS
*Acting Director of the United States Patent and Trademark Office*